US010223233B2

(12) United States Patent
Abou Mahmoud et al.

(10) Patent No.: US 10,223,233 B2
(45) Date of Patent: *Mar. 5, 2019

(54) APPLICATION SPECIFIC INTERACTION BASED REPLAYS

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US); Ying Mo, Beijing (CN)

(73) Assignee: International Business Machines Corporation, Armonk, NY (US)

(*) Notice: Subject to any disclaimer, the term of this patent is extended or adjusted under 35 U.S.C. 154(b) by 454 days.

This patent is subject to a terminal disclaimer.

(21) Appl. No.: 14/918,833

(22) Filed: Oct. 21, 2015

(65) Prior Publication Data

US 2017/0116104 A1 Apr. 27, 2017

(51) Int. Cl.
*G06F 3/048* (2013.01)
*G06F 11/34* (2006.01)
*G06F 3/01* (2006.01)
*G06F 3/03* (2006.01)
*G06F 3/00* (2006.01)
*G06F 1/3231* (2019.01)
*G06F 3/023* (2006.01)
*G06F 3/038* (2013.01)

(52) U.S. Cl.
CPC ............ *G06F 11/34* (2013.01); *G06F 1/3231* (2013.01); *G06F 3/005* (2013.01); *G06F 3/013* (2013.01); *G06F 3/023* (2013.01); *G06F 3/0304* (2013.01); *G06F 3/038* (2013.01); *G06F 3/012* (2013.01); *Y02D 10/173* (2018.01)

(58) Field of Classification Search
None
See application file for complete search history.

(56) References Cited

U.S. PATENT DOCUMENTS

| 5,961,601 | A  | 10/1999 | Iyengar |
| 6,237,138 | B1 | 5/2001 | Hameluck et al. |
| 7,900,186 | B2 | 3/2011 | Lucassen et al. |
| 8,281,285 | B2 | 10/2012 | Ruehle |
| 8,756,326 | B1 | 6/2014 | Elberse et al. |
| 8,937,591 | B2 | 1/2015 | Julian |

(Continued)

OTHER PUBLICATIONS

News RX reporter, Patent Issued for method for operating user functions based on eye tracking, Aug. 12, 2015, Journal of Engineering, pp. 1-3 (Year: 2015).*

(Continued)

*Primary Examiner* — Tam T Tran
(74) *Attorney, Agent, or Firm* — Scott S. Dobson

(57) ABSTRACT

A user's interactions with an application may be recalled for a user upon the user's return to an application. Interactions including a point of gaze and input interactions by a user within an application may be recorded. A user may become distracted, no longer interacting with the application, and this can be detected. In response, a segment of the recorded interactions can be saved. This segment can determined based on a time period prior to the detection that the user is distracted. When the user's interaction returns to the application, this can be detected, and the saved segment of interactions can be replayed to the user.

15 Claims, 4 Drawing Sheets

(56) References Cited

U.S. PATENT DOCUMENTS

| | | | |
|---|---|---|---|
| 9,606,622 B1* | 3/2017 | Brothers | G06F 3/013 |
| 2004/0155910 A1 | 8/2004 | Chang et al. | |
| 2013/0275899 A1 | 10/2013 | Schubert et al. | |
| 2014/0002352 A1 | 1/2014 | Jacob et al. | |
| 2014/0306882 A1* | 10/2014 | Johansen | G06F 3/013 345/156 |
| 2014/0325437 A1* | 10/2014 | Pacenta | G06F 3/04883 715/793 |
| 2015/0036999 A1* | 2/2015 | Batur | G06F 3/013 386/230 |
| 2015/0046909 A1 | 2/2015 | Ligman et al. | |

OTHER PUBLICATIONS

Koninklijke Philips N. V., Method and apparatus for causing a device to enter an active mode, Nov. 19, 2014, Journal of Engineering, pp. 1-5 (Year: 2014).*

Komlodi et al., "Search history support for finding and using information: User interface design recommendations from a user study", Science Direct, Information Processing and Management, Copyright 2006 Published by Elsevier Ltd., pp. 10-29. DOI:10.1016/j.ipm.2006.05.017.

Lijian et al., "ALRS : Agent-based Literature Recommendation System", Research supported by the National Natural Science Foundation of China, National Basic Research Program of China, © 2009 IEEE, pp. 1-4.

Park et al., "Keeping Narratives of a Desktop to Enhance Continuity of On-going Tasks", JCDL'08, Jun. 16-20, 2008, Pittsburgh, Pennsylvania, USA. Copyright 2008 ACM, pp. 393-396.

Parnin et al., "Resumption strategies for interrupted programming tasks", Software Qual J, Published online: Aug. 10, 2010, Copyright Springer Science+Business Media, LLC 2010, pp. 5-34. DOI: 10.1007/s11219-010-9104-9.

Skopik et al., "Improving Revisitation in Fisheye Views with Visit Wear", CHI 2005, Apr. 2-7, 2005, Portland, Oregon, USA. Copyright 2005 ACM, pp. 771-780.

Thies et al., "Intelligent User Support in Graphical User Interfaces: InCome: A System to Navigate through Interactions, Plan-Based Graphical Help in Object-Oriented User Interfaces", Research Report, Mar. 1992. © Deutsches Forschungszentrum fur Kunstliche Intelligenz, 1992, 32 pages.

Tkachuk et al., "Models and Tools for Effectiveness Increase of Requirements Traceability in Agile-Software Development", National Technical University "Kharkiv Polytechnic Institute", Ukraine and Alpen-Adria University of Klagenfurt, Austria. © M.V. Tkachuk, R.O. Gamzayev, H.C. Mayr, V.O. Bolshutkin, 2012, pp. 160-167. ISSN 1727-4907.

Voo, B., "Top 5 Free Screen Recording Softwares for Windows", Hongkiat, pp. 1-8. Last printed on Jul. 9, 2015. http://www.hongkiat.com/blog/win-screen-recording-softwares/.

"Accelerated Examination Support Document", International Business Machines Corporation, dated Mar. 18, 2016, 10 pages.

Abou Mahmoud et al., "Application Specific Interaction Based Replays", U.S. Appl. No. 15/080,651, filed Mar. 25, 2016.

List of IBM Patents or Patent Applications Treated as Related, dated Mar. 22, 2016, pp. 1-2.

Lee et al., "User Interest Visualizing and Analysing System using Eye Gaze", CACT, Jul. 2015, 4 pages.

Walber et al., "Benefiting from users' gaze: selection of image regions from eye tracking information for provided tags", Multimed Tools Appl, 2014, Copyright Springer Science+Business Media, New York, 29 pages.

* cited by examiner

APPLICATION SPECIFIC INTERACTION BASED REPLAYS

BACKGROUND

The present disclosure relates to user experience, and more specifically, to tracking user interaction with an application.

Eye tracking technologies may measure either a point of gaze or the motion of an eye relative to a user's head. Eye tracking technologies including devices such as eye trackers which measure eye positions and eye movement. Some eye trackers may function by using video images from which the relevant eye position is extracted. A wide variety of disciplines may use eye tracking techniques, including cognitive science, psycholinguistics, human-computer interaction, marketing research, and medical research.

SUMMARY

Embodiments of the present disclosure may be directed toward a method for recalling a user's interactions with an application. Interactions of the user can be recorded. These interactions may include a point of gaze for the user on a display of the application as well as input interactions by the user with the application on a user interface. The system may detect an absence of the user's interaction with the application and save a segment of the recording of the interactions of the user with the application. The segment that is saved may be determined based on a certain amount of time prior to the detecting the absence of interaction. After any period of time, a returned interaction can be detected and the recorded segment of the recording can be displayed on the user interface.

Embodiments of the present disclosure may be directed toward a computer system for recalling a user's interactions with an application. The system may have a camera, a display, and a computing device. The computing device may be in communication with the camera and the display. The computing device may comprise a computer readable medium with program instructions stored thereon and one or more processors configured to execute program instructions. The program instruction may cause the processor to perform a method that includes recording the interactions of the user with the application. The interactions may include both point of a gaze for the user as well as the input interactions by the user with the application on the user interface. An absence of interaction of the user can be detected and in response to the detecting, a segment of the recording can be saved. This segment can be determined based on a particular time period prior to the detecting the absence of interaction of the user. A returned interaction can then be detected and the recorded segment can be displayed on the user interface.

Embodiments of the present disclosure may be directed toward a computer program product for recalling a user's interactions with an application. The computer program may have a computer readable storage medium with program instructions, where the computer readable storage medium is not a transitory signal per se. The program instructions may be executable by a computer processing circuit to cause the circuit to record the interactions of the user with the application. The interactions may include point of a gaze for the user on a display of the application and input interactions by the user with the application on a user interface. The system may detect an absence of interaction of the user with the application. A segment may be saved in response to the detecting. The segment may be determined based on a period of time prior to the detection of an absence of interaction. A return of interaction may then be detected and the recorded segment may be replayed to the user on the display.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
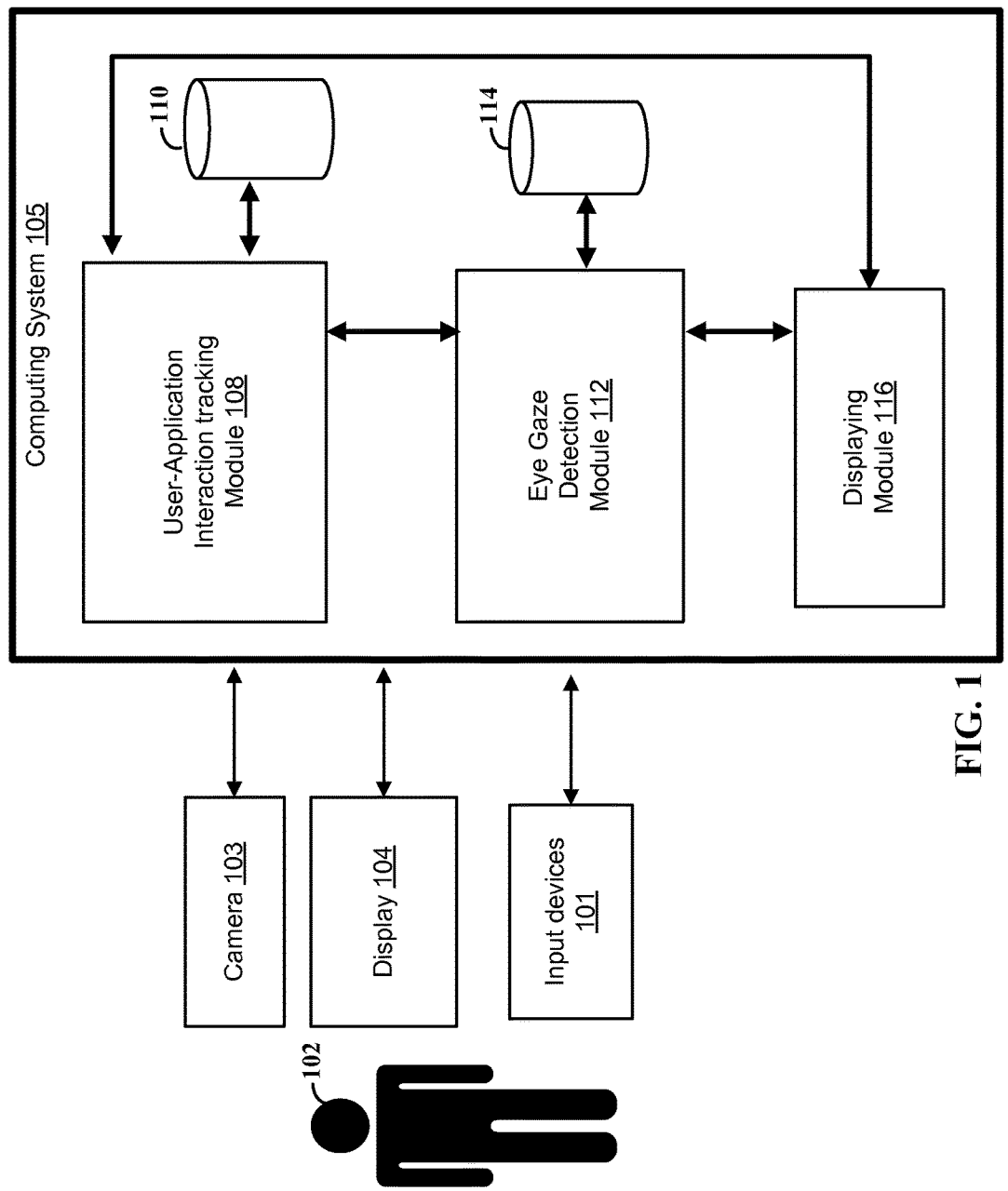
FIG. 1 depicts a block diagram of a system for recalling a user interaction with an application, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to monitoring user interactions with a computer application, more particular aspects relate to tracking and replaying user interactions with an application. While the present disclosure is not necessarily limited to such applications, various aspects of the disclosure may be appreciated through a discussion of various examples using this context.

Modern computing may result in a user interacting with a number of applications, and being interrupted by various other distractions while the user is trying to get work done. At times, these distractions may pull a user's attention away from an application in which the user was working. This can result in the user losing track of his or her place, as well as having to take time to remember and locate where in the application they had most recently been working.

For example, a user may be focused and working in a programming application, and a phone notifications may pull the user's attention away from the screen. The user may need to reply to an urgent message that was received on the phone, via a text or phone call. During this time, the user may momentarily forget about his work, and instead focus attention on appropriately responding to the phone message. Once the message has been delivered, the user may redirect his attention to the work he was doing in the programming application. It may take him some time and focus to remember both what he was working on as well as where in the application he was working.

Various embodiments of the present disclosure are directed toward a computer system that can record a user's interactions with an application, and recall, for the user, the user's most recent interactions with the application prior to the user being distracted away from his work in the application. The user's interactions as used herein may include both the user's point of a gaze as well as the user's input interactions with the application using, for example, external devices. The user's point of a gaze may be defined as locations on a user interface where the user is looking. This may be detected by a camera mounted to or installed within a user device like a laptop computer or mobile device. The user's input interactions with the application can include, for example, a user's "mouse clicks", edits via a keyboard, or other interactions using external devices, touchscreens, or other technology to enable the user to interact with the application. The user's interactions can include both the location and time of the user's point of a gaze, as well as any input interactions the user may have with the application (e.g., keyboard entries, touchscreen, or mouse interaction).

According to embodiments, the system can record the user's interactions with the application. As discussed and used herein, interactions can include a point of gaze on a user interface as well as the input interactions with the application as the user works in the application using, for example, external devices such as a mouse or keyboard. For example, a user may be working in a photo editing application on his laptop. A camera built into the user's laptop can record the various locations on the laptop's screen where the user is looking, or the user's points of gaze. The system can also record the user's interactions with the application, for example, the system could record that the user was editing a particular edge of a mountain, in a landscape portrait, using a particular tool, set to a particular size and opacity.

The system can then detect an absence of interaction with the application by the user. For example, the system could detect that the user has looked away from the laptop screen and is no longer working on the photo editing. Once the system detects that the user is no longer interacting with the application, the system can save a segment of the recording. This segment may be a particular time period that the user was interacting with the application prior to the absence of interactions (e.g., the user's response to the interruption).

The system can then monitor for the user's returned interaction with the application. In response to detecting that the user is again working in the application, the system can display on the user interface the segment of recording of the user's interactions prior to the interruption. For example, the system can display, on the user interface, focus points of the user's gaze (where on the screen the user was looking) as well as the user's input interactions with the application (where on the screen the user clicked, typed, etc.). For example, a user may have been responding to a text message on a phone and was distracted away from editing work on his laptop in a photo editing application. Upon the user's return to the editing application, an overlay on the laptop's screen can play back the segment of the user's last interactions with the application prior to the interruption. The system could also display the recorded segment of the user's interactions on a smaller screen (e.g., picture-in-picture).

FIG. 1 depicts a block diagram of a computing system 105 for recalling a user interaction with an application, according to embodiments. For example, computing system could be computer system 401 depicted in FIG. 4. The system 105 may comprise one or more computer processing circuits, where the circuits may be configured to implement the modules described herein. The system may include more, fewer, or other modules than those described herein. The computer system 105 is in communication with a camera 103, a display 104, and one or more input devices 101. Input devices may include a keyboard, a mouse, or another input device. In some embodiments, the camera 103 and display 104 could be physically connected to the computer system, for example, as in a tablet, smartphone, or laptop computer. In other embodiments, one or more of the camera 103 and the display 104 could communicate with the system 105 over one or more networks. Thus, the camera 103 and the display 104 may communicate with the system 105, and may also receive input from a user 102. For example, the camera could receive input from the user via buttons or in another way. For example, if the display is a touch screen display, the user 102 could interact with the system through the display. The display may display input to the user 102 received from the system 105. A user 102 may interact with one or more applications via the display 104. For example, the display 104 may be a screen on a laptop computer. The display 104 could also be a screen of a mobile device (e.g., tablet or phone), desktop computer, or another device. The user may run one or more application which could be displayed on the display 104. The user-application interaction tracking module 108 may be initiated by a user. Once initiated, the system 105 may communicate with the camera 103 to begin recording a user's visual interactions with a particular application on the display 104. As described herein, the interactions of a user may comprise both the user's interactions with the application via, for example, external devices such as a mouse or keyboard, as well as the user's point of gaze (e.g., visual focus points) on the user interface on which the application is being displayed and on which the interaction is occurring. The user's point of a gaze may be detected based on data received from the camera 103.

The system 105 may comprise a user-application interaction tracking module 108, an eye gaze detection module 112, and a displaying module 116. The system 105 may also comprise one or more databases 110 and 114, or others, as described herein. The user-application interaction tracking module 108 may detect and record a user's interaction with an application, including interactions such as typing, "clicking" with a mouse, or other selections. The data may be recorded and temporarily stored in a user-application interaction tracking database 110 for access by the display module 116. The eye gaze detection module 112 may communicate with the camera 103 and receive data from the camera 103 to detect and record locations of a user's point of gaze on a user interface of the device 104. The point of gaze location data may be stored in an eye gaze detection module database 114, temporarily and for use by the system in recalling and displaying relevant recorded point of gaze data for the user. The data recorded and temporarily stored by user application interaction tracking module 108 and eye gaze detection module 112 can together comprise the interaction data for the user 102.

As described herein, the user 102 may, at some point while working in the application and being monitored by the camera 103 in communication with system 105, become distracted away from work on the particular application. This distraction could be, for example, an incoming text message on a smart device, or an alert on another application (e.g., email) on a device. For example, the user 102 may open another application on top of the one he was running, in which case the eye gaze detection module 112 could detect an absence of interaction. When this occurs, the eye gaze detection module 112 can detect that the user has become distracted and is no longer engaging the application via the user interface of the device 104. This detection could be based on a determination that a particular threshold has been met, for example a duration of time the user's point of gaze is not directed at the application has reached a particular predetermined or user-determined time limit. For example, a threshold could be set for a particular period of inactivity within the application as well as a particular duration of time during which the user has not maintained visual contact with the application. The threshold could also be determined based on a particular period of time between interactions over a set period of time. For example, if a user does not interact with an application more than once every four minutes, over a certain period of time like 20 minutes, this could meet a threshold defined by the aforementioned parameters. The detection could also be determined in another way, based on user-configurable settings, or in another manner.

Upon detecting an absence of interaction with the application by the user (e.g., the user has become distracted), the user-application interaction tracking module 108 may save a segment of the recording of the interactions of the user with the application. This segment of the recording of the interactions may be based on a particular time period prior to the eye gaze detection module 112, in communication with the camera 103, detecting the absence of an interaction with the application by the user. The user-application interaction tracking module 108 may first identify a period of inactivity, during which time the user is still considered to be interacting with the application, but has not interacted in a period of time below the threshold needed to qualify as an absence of interaction. In response to the identifying a period of inactivity (prior to the detecting an absence of interaction), a predetermined time period for the recorded and saved segment (e.g., ten seconds) could be extended, in order to account for the period of inactivity that was recorded. The period of time recorded and saved by the system may be determined then, based on, in part or in full, the period of inactivity.

For example, the user-application interaction tracking module 108 could be configured to save the prior ten seconds of recorded visual activity as the segment. In embodiments, the system may be able to detect when the user-application interaction tracking aspect of the user's interactions did not change in the previous five seconds (i.e. a period of inactivity), and compress that recording into one second. Thus, the period of time over which the segment is recorded could be extended based on a period or periods of inactivity. The length of time in each of these examples is to provide illustration only, and the time that qualifies as an absence could be based on user-configurable settings, or other parameters. The segment could also be based on the number of user-application interactions prior to the detection of a distraction. For example, the segment could comprise the previous ten user actions within the application, and the particular time period prior to the detection of an absence of user interaction could be determined by the period of time during which the last ten user actions occurred.

The eye gaze detection module 112 could then detect a returned user interaction with the application. Upon this detection, a displaying module 116 can access, from the database 110 and from the database 114, the recorded and saved segment of interaction. The displaying module 116 can then replay the segment to the user 102 by displaying the segment on the display 104. The segment can be displayed by the displaying module 116 on the user interface as an overlay of the current application. The segment could also be replayed in a small screen, for example, in the corner of a laptop screen, so as to not interfere with current work. The segment could also be displayed for the user 102 in another way, and could be determined by the particular user 102 for the particular application.

Figure 2:
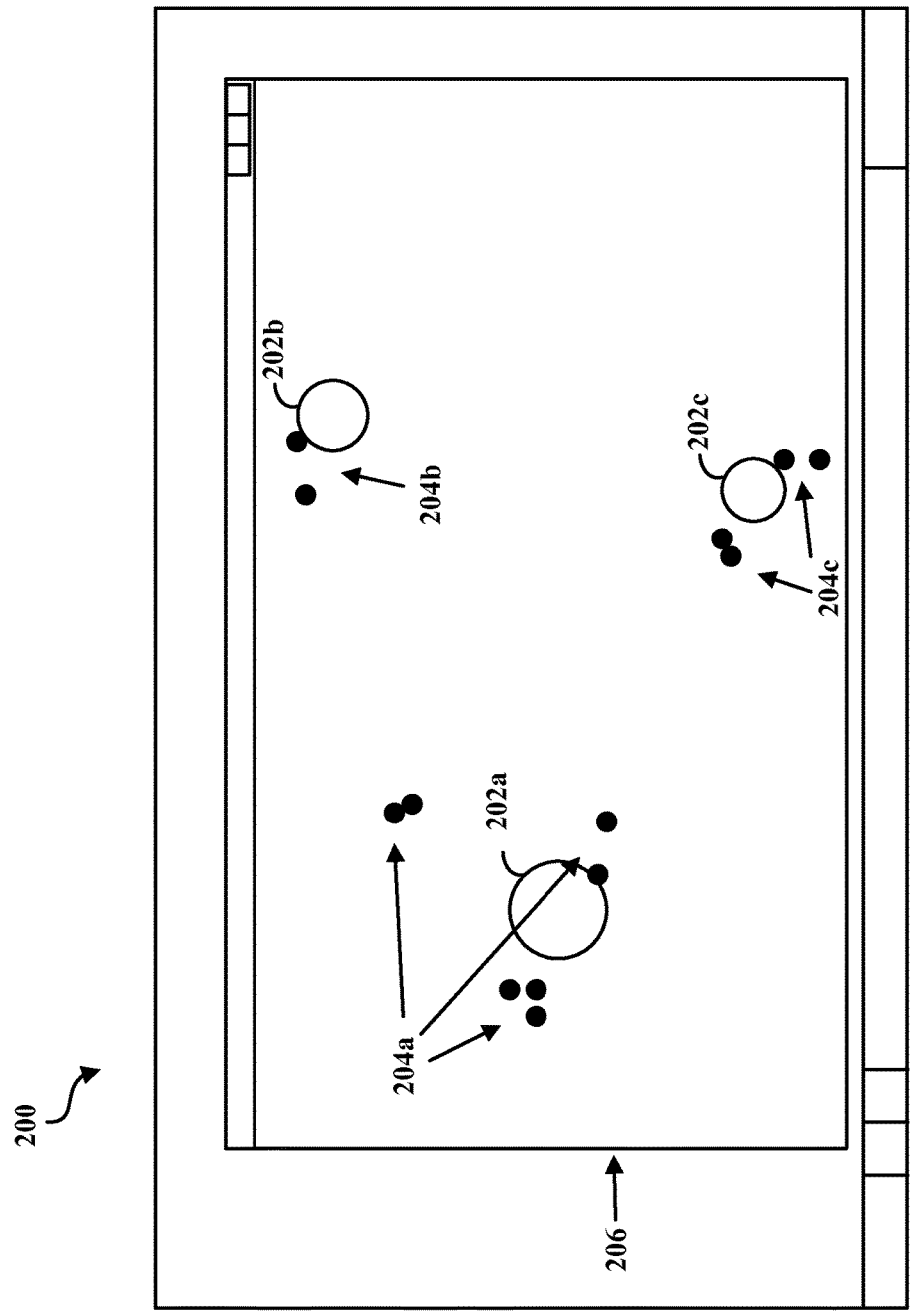
FIG. 2 depicts a user interface on which a user's interaction with an application may be displayed, according to embodiments.

FIG. 2 depicts a user interface 200 on which a user's interaction with an application 206 may be displayed, according to embodiments. The user interface may have one or more applications running, for example, application 206. In embodiments, the display of the application 206 on user interface 200 may be presented upon a user's returned attention to an application the user was previously working in, for example, after a distraction. A replay of the user's previous interactions may be displayed as on overlay to the application 206 (e.g. directly over the top of the application as it is currently running). For example, points 202 including 202a, 202b, and 202c, may depict points of gaze for the user. In some embodiments, the size of the point 202 could indicate the quantity of time the user's gaze was focused on the particular point. For example, point 202a could indicate to a user that in the determined period of time prior to the distraction, the user's gaze was focused for the most amount of time on that particular point of the application 206.

The point 202 could also depict a locus of the user's gaze for a particular portion of the screen. The point 202 could also indicate other aspects related to the user's point of gaze, and could be based on settings configured by a user or system administrator or determined in another way. Dots 204, including 204a, 204b, and 204c could similarly be displayed over the top of an application as an overlay and could indicate to the user the user interactions with the application. Here, for example, if the application 206, from which the user had been distracted, was a photo editing application, each dot 204 could indicate a user's mouse click on a particular area of the photo. The dots 204 indicating user-application interaction may be associated with the points 202 indicating the user's point of gaze, as a user may likely be looking at the portion of the application on the user interface on which he is working. However, this need not be the case, and the two need not be correlated in any way.

Though all depicted in FIG. 2, the point of gaze points 202 and the user-application interaction dots 20 may appear and disappear according to the user's interactions with the application. For example, the content (points and dots 202 and 204, respectively) displayed on application 206 could be all of the interaction data saved in a particular segment. When the segment is replayed, via a user interface, it could move sequentially through time, to show the user a video (rather than single frame) of interaction. For example, various dots and points of those comprising 202a and 204a may appear and disappear. Then, the dots and points at 202b and 204b may appear and disappear. Finally, those at 202c and 204c could be displayed on the user interface. In this way, the system could display the user's interactions over time—from the left side of the application (202a and 204a), to the upper right side (202b and 204b), and finally to the lower middle region of the application (202c and 204c). In embodiments, the user interactions could remain on the screen after being displayed, and thus the final frame could be displayed as on user interface 200. The detail, style, and flow of the replay could be controlled by settings.

The display of the user's interactions with the application upon his return from distraction to the application could also be displayed in a way other than as an overlay. For example, the replay of the user's interactions could be displayed in a "picture-in-picture" by displaying a small window in a corner of the user interface 200 in which a screen showing the user's interactions over the application is displayed. This could occur prior to or during the user beginning work in the application again (but after he returns to the application). For example, a replay of the segment, including the application in the background, could appear in the picture in picture display. The replay of the segment could also include a series of screenshots taken from, for example, database 110 (of FIG. 1).

Figure 3:
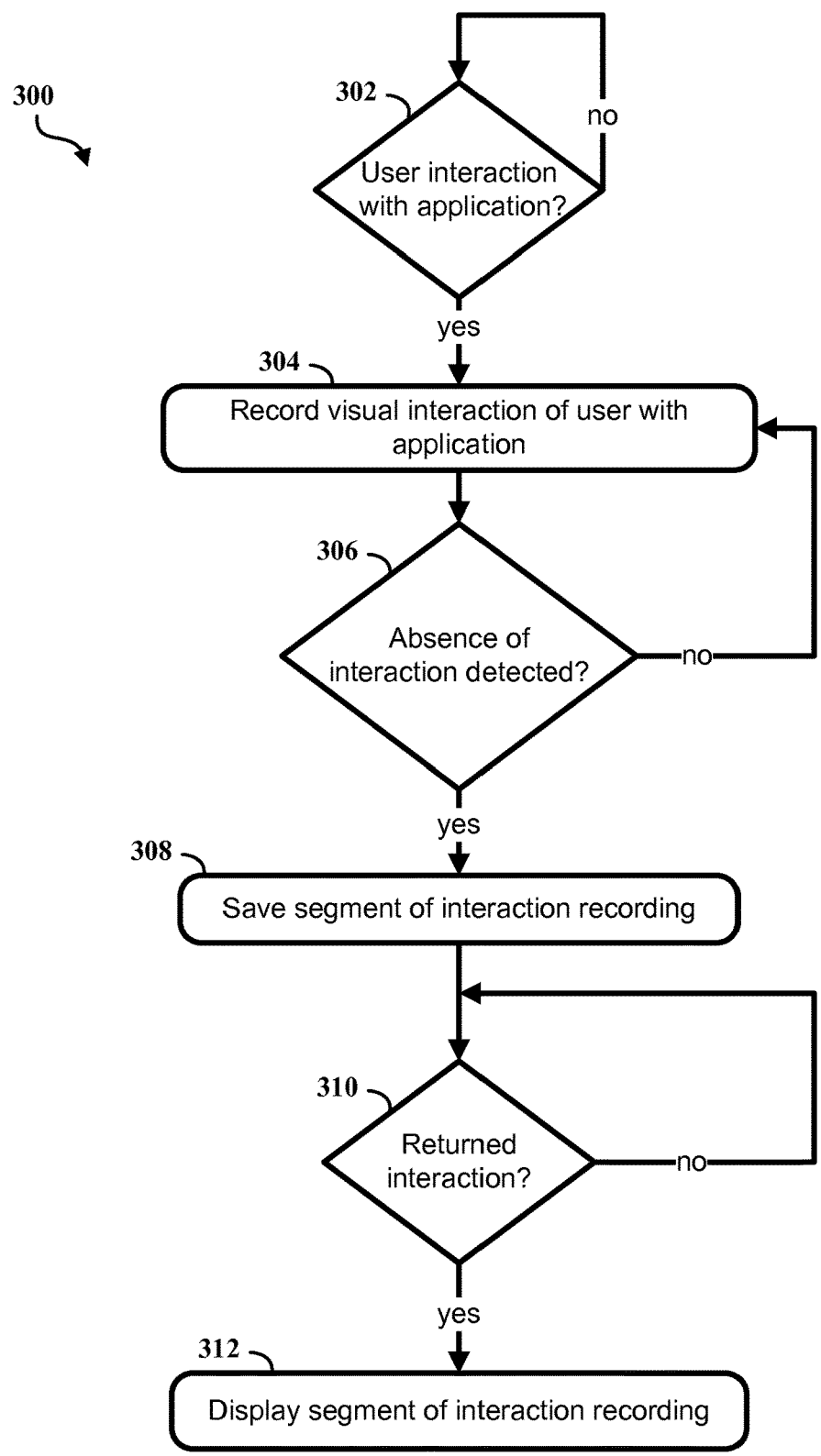
FIG. 3 depicts a flow diagram of a method for recalling a user's interactions with an application, according to embodiments.

FIG. 3 depicts a flow diagram of a method 300 for recalling a user's interactions with an application, according to embodiments. The method may begin with the system determining whether an interaction with the application has occurred, per 302. If no interaction with the particular application is detected, the system may continue to monitor for interaction from the user with the particular application. Once interaction has been detected, the system may record the interaction of the user with the application, per 304. For example, if a user is typing in a spreadsheet, the system may record both the user's point of a gaze as well as his interactions (e.g., typing) in particular cells of the spreadsheet. The system may determine whether or not an absence of interaction with the application has occurred, per 306. This absence may be determined based on a particular threshold of inactivity and/or a period of time of no interaction. The absence may be determined in another way, based on user-configurable settings. For example, a user may receive a notification on his email and switch from the spreadsheet to an email application, thus triggering the system to detect an absence of an interaction.

If no absence is detected, the system can continue to record interactions with the applications, per 304. However, once an absence of interaction is detected by the system, a segment of the interaction recording may be saved, per 308. The length of the segment may be determined as described herein. The system may then determine whether or not there has been a return of interaction by the user, per 310. For example, the user may respond to an email, and return to the spreadsheet he was working on prior to the interruption. This may be a brief interruption, or it could be one lasting minutes, hours, or longer. If there is not returned interaction at 310, the system may return to monitoring for the user to return to the application. If the system does detect a returned interaction, the system may display the segment of interaction with the application to the user, via the user interface, per 312. This display may occur as discussed herein.

Figure 4:
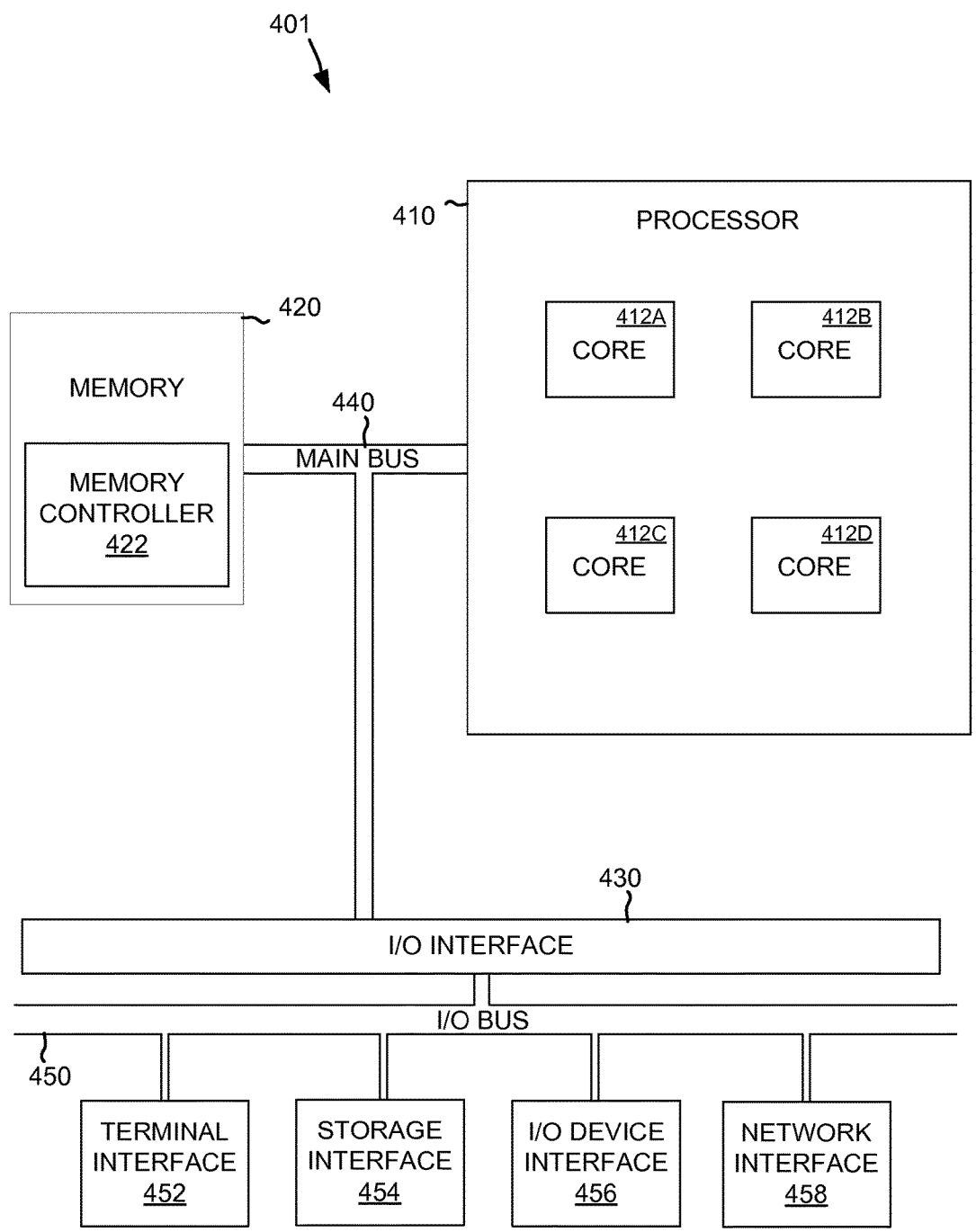
FIG. 4 depicts the representative major components of an example computer system that may be used, according to embodiments.

FIG. 4 depicts the representative major components of an example computer system 401 that may be used, according to embodiments. It is appreciated that individual components may vary in complexity, number, type, and\or configuration. The particular examples disclosed are for example purposes only and are not necessarily the only such variations. The computer system 401 may comprise a processor 410, memory 420, an input/output interface (herein I/O or I/O interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or methods consistent with embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for recalling a user's interactions with an application, the method comprising:
   recording the interactions of the user with the application, the interactions comprising point of gaze for the user on a display of the application and input interactions by the user with the application on a user interface, wherein input interactions comprise input via external devices;
   detecting an absence of interaction of the user with the application, wherein detecting the absence of interaction of the user comprises identifying a period of absence of interaction on the user interface and determining the period of absence meets a threshold period of time;

saving, in response to the detecting, a segment of the recording of the interactions of the user with the application, the segment of the recording based on a particular time period prior to the detecting the absence of interaction of the user with the application;

detecting a returned interaction of the user with the application; and displaying, on the user interface, the segment of the recording of the interaction of the user with the application.

2. The method of claim 1, further comprising identifying a period of inactivity prior to the detecting the absence of interaction, wherein the period of inactivity is identified based on the period of absence falling below the threshold period of time, and wherein the particular time period is determined based on the identified period of inactivity.

3. The method of claim 1, wherein the segment of the recording is displayed as an overlay over the application.

4. The method of claim 1, wherein the segment of the recording is displayed in a corner of the user interface while the application is running.

5. The method of claim 1, wherein the input interactions by the user with the application on a user interface comprise mouse interactions and keyboard entries.

6. A system for recalling a user's interactions with an application, the system comprising:

a camera;

a display; and a computing device in communication with the camera and the display, the computing device comprising a computer readable medium with program instructions stored thereon and one or more processors configured to execute the program instructions to perform a method comprising:

recording the interactions of the user with the application, the interactions comprising point of gaze for the user on the display, the point of gaze determined by data received from the camera, and input interactions by the user with the application on a user interface, wherein input interactions comprise input via external devices;

detecting an absence of interaction of the user with the application, wherein detecting the absence of interaction of the user comprises identifying a period of absence of interaction on the user interface and determining the period of absence meets a threshold period of time;

saving, in response to the detecting, a segment of the recorded interactions of the user with the application, the segment based on a particular time period prior to the detecting the absence of interaction of the user with the application;

detecting a returned interaction of the user with the application; and displaying, on the display and on the user interface, the segment of the interaction of the user with the application.

7. The system of claim 6, wherein the method further comprises identifying a period of inactivity prior to the detecting the absence of interaction, wherein the period of inactivity is identified based on the period of absence falling below the threshold period of time, and wherein the particular time period is determined based on the identified period of inactivity.

8. The system of claim 6, wherein the segment of the recording is displayed as an overlay of the application.

9. The system of claim 6, wherein the segment is displayed in a corner of the user interface while the application is running.

10. The system of claim 6, wherein the input interactions by the user with the application on the user interface comprise mouse interactions and keyboard entries.

11. A computer program product for recalling a user's interactions with an application, the computer program product comprising a computer readable storage medium having program instructions embodied therewith, wherein the computer readable storage medium is not a transitory signal per se, the program instructions executable by a computer processor to cause the processor to perform a method comprising:

recording the interactions of the user with the application, the interactions comprising point of gaze for the user on a display of the application and input interactions by the user with the application on a user interface, wherein input interactions comprise input via external devices;

detecting an absence of interaction of the user with the application, wherein detecting the absence of interaction of the user comprises identifying a period of absence of interaction on the user interface and determining the period of absence meets a threshold period of time;

saving, in response to the detecting, a segment of the recording of the interactions of the user with the application, the segment based on a particular time period prior to the detecting the absence of interaction of the user with the application;

detecting a returned interaction of the user with the application; and displaying, on the user interface, the segment of the recording of the interaction of the user with the application.

12. The computer program product of claim 11, wherein the method further comprises identifying a period of inactivity prior to the detecting the absence of interaction, wherein the period of inactivity is identified based on the period of absence falling below the threshold period of time, and wherein the particular time period is determined based on the identified period of inactivity.

13. The computer program product of claim 11, wherein the segment is displayed as an overlay of the application.

14. The computer program product of claim 11, wherein the segment of the recording is displayed in a corner of the user interface while the application is running.

15. The computer program product of claim 11, wherein the input interactions by the user with the application on the user interface comprise mouse interactions and keyboard entries.

* * * * *